Nov. 15, 1966  C. R. A. JOHNSON  3,285,484
TENSIONING DEVICE FOR RECORDER CHART PAPER
Filed Dec. 11, 1964
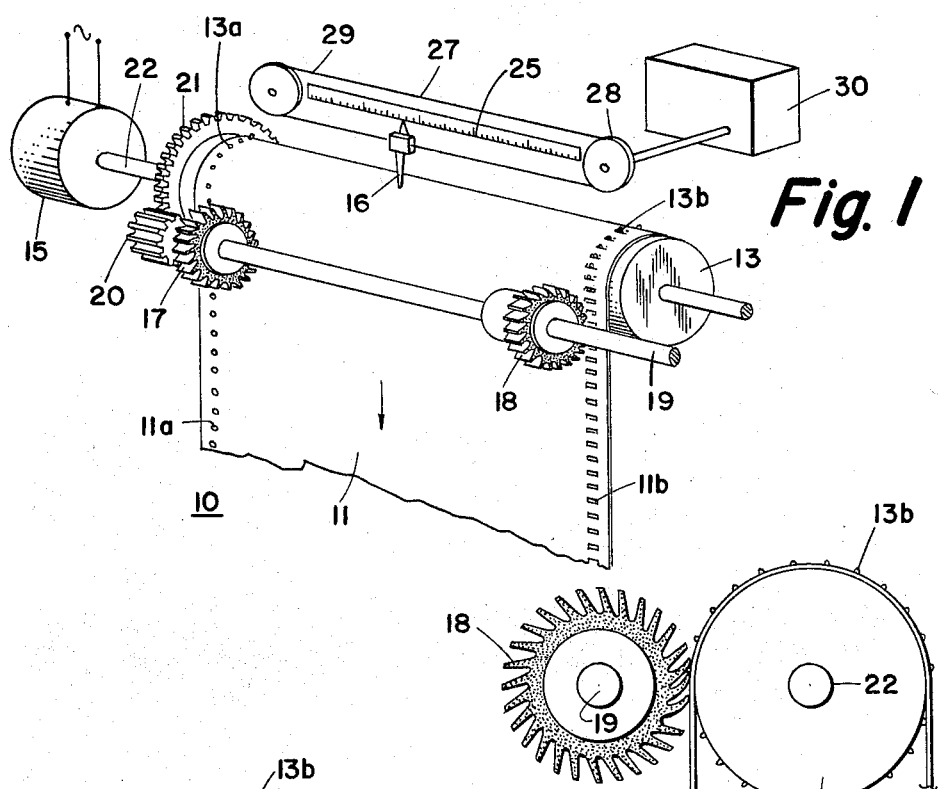
Fig. 1
Fig. 2
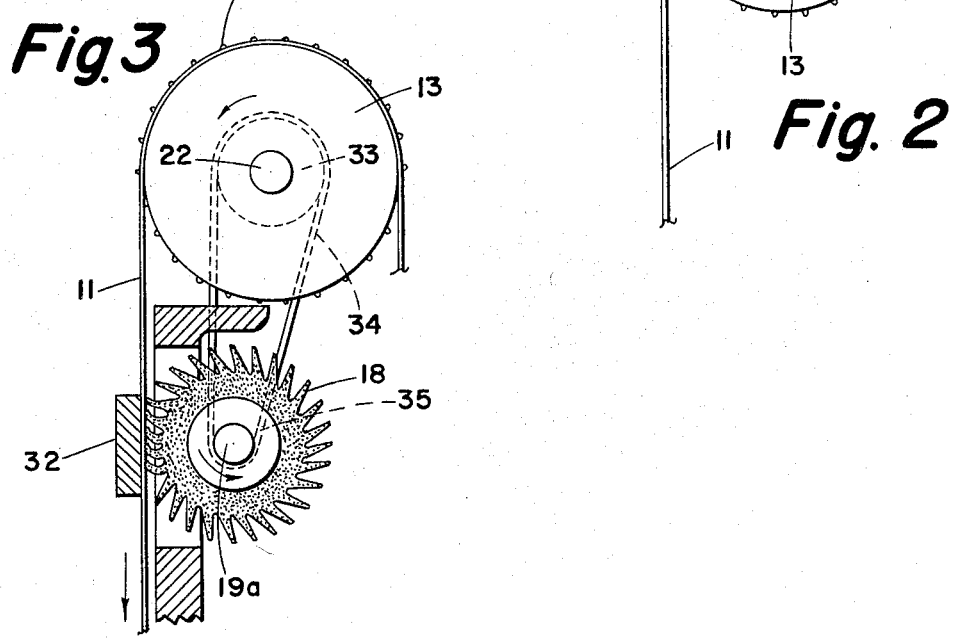
Fig. 3

United States Patent Office 3,285,484
Patented Nov. 15, 1966

1

3,285,484
TENSIONING DEVICE FOR RECORDER CHART PAPER
Curtis R. A. Johnson, Flourtown, Pa., assignor to Leeds & Northrup Company, Philadelphia, Pa., a corporation of Pennsylvania
Filed Dec. 11, 1964, Ser. No. 417,683
10 Claims. (Cl. 226—85)

This invention relates to recorders of the type in which the recording paper is maintained in tension to assure firm engagement with driving pins of a driving roll, and has for an object means for maintaining the paper in the proper tension without the use of a take-up roll or spring-loaded rollers.

In the operation of this type of recorder, it is necessary to thread the recording paper over the driving pins of a driving roll and to maintain the chart paper in tension in order to assure that the chart paper maintains its driving engagement with the driving pins. This tensional force has, in some prior art devices, been developed by utilizing a take-up roll with a slip clutch provided so that the drive shaft of the take-up roll may be rotated at a slightly higher speed than the drive roll, thus maintaining the recording paper in tension and assuring the aforesaid driving relationship with the driving elements.

Though the aforesaid arrangement has been widely used, it leaves something to be desired in that if an operator wishes to inspect fairly long lengths of paper of previously recorded events, it becomes necessary either to overcome the friction of the frictional driving clutch or release the take-up roll in order that the recording paper may be unrolled for easy inspection. In some applications, it is desirable that prior events may be inspected over relatively long periods of time, or where high speed movement of the recording paper is needed to provide for inspection of relatively long lengths of recording paper corresponding to short lengths of time.

In other prior art devices, the take-up roller has been eliminated and other tensioning means provided which will permit the ready inspection of the chart paper. These prior art devices are characterized in that they employ two smooth friction rollers which are placed on opposite sides of the chart paper in opposing relationship. One of these rollers is a friction roller and is driven in relation to the chart paper drive roller. The other roller is a pressure roller. Spring or other pressure means are provided to maintain the two rollers and chart paper between them in compression. By this means, the required frictional force on the chart paper is maintained as the friction roller is rotated.

However, the tensioning arrangement utilizing two rollers has certain drawbacks. The two rollers, supporting apparatus and spring or pressure means comprise a large number of components, thus resulting in an increased cost, as well as occupying a large amount of space in a recorder housing. Further, the smooth friction rollers must be relatively large in order that there will be sufficient surface area thereof in contact with the chart paper to provide the proper amount of tension without tearing or wrinkling the chart paper.

In accordance with the present invention, the need of a take-up roller or opposing rollers and associated pressure means is eliminated while, at the same time, a tensioning device is provided which is simple in structure, compact and inexpensive and which permits immediate and ready inspection of the chart paper. More particularly, there is provided a plurality of frictional tension-developing members each having thereon a plurality of flexible fingers. The resilient or spring-like action of the flexible fingers controls the amount of spring force or pressure that the fingers exert upon the chart paper, thereby controlling the amount of friction force and resulting tension on the chart paper.

For further objects and advantages of the invention and for a detailed description of a preferred embodiment thereof, reference is to be had to the specification taken in conjunction with the accompanying drawings, in which:

FIG. 1 is an isometric view of the essential parts of the recorder to which the invention has been applied;

FIG. 2 is an end view of the drive roll and one of the frictional tension-developing members, and FIG. 3 illustrates a further embodiment of the invention in which the frictional tension-developing members have been illustrated in association with a tear-off strip provided for the paper.

Referring now to the drawings, the invention in one form has been shown applied to a recorder 10 having recording paper 11 supplied from a supply roll (not shown) and which has on one side a series of circular openings 11a threaded onto a plurality of cylindrical pins 13a on the left-hand side of a drive roll 13. A second set of cylindrical driving pins 13b at the right-hand side of the roll extend through rectangularly slotted openings 11b extending along the right-hand edge of the paper 11. Thus when the drive roll 13 is rotated by the paper drive motor 15, the paper is moved in a counterclockwise direction around and about the roller 13.

In order to maintain the chart paper 11 in firm engagement with the drive pins 13a and 13b and also to maintain the paper in smooth contact with the drive roll 13 in the region of a pen index 16, there are provided two frictional tension-developing members 17 and 18 positively mounted on a shaft 19. The shaft 19, suitably and rigidly supported in a frame (not shown), has a driven gear 20 meshing with a driving gear 21 secured to the drive shaft 22 of motor 15. It is to be noted that the driven gear 20 is of smaller diameter than the driving gear 21. Accordingly, the shaft 19 rotates at a higher speed. Each of the frictional tension-developing members 17 and 18 includes a plurality of flexible fingers with lengths such that they successively engage the chart paper in the region of the drive roll 13 and are dragged downwardly along the paper to maintain the chart paper as a whole under tension. By providing only two frictional tension-developing members 17 and 18 adjacent and preferably inwardly of the series of driving openings 11a and 11b, the driving engagement is always maintained, and the chart paper throughout the length of the roll is maintained in conformity with the cylindrical shape of the roll to provide a smooth surface on which the pen part of the pen index 16 may apply its record. The pen index 16, of course, may include any kind of marking device and may also include, as shown, an indicia from which values may be read on an associated scale 25.

The pen index 16 itself may be driven in conventional manner by a driving cord 27 threaded on supporting pulleys 28 and 29, the driving pulley 28 of which is rotated in accordance with the output of a measuring system 30 which may be of the type shown in Williams Patent No. 2,113,164. For details as to the manner in which the supply roll may be mounted and for a typical instrument to which this invention may be applied, reference may also be had to Ross et al. Patents Nos. 2,074,118 and 2,080,065, as well as Moore Patent No. 2,690,951.

More specifically, as illustrated in FIG. 2, the paper drive roll 13 rotates in a counterclockwise direction with the frictional tension-developing member 18 rotating in a clockwise direction, but at a higher speed, the flexible fingers of the member 18 providing a continuous and successive wiping action on the paper, thereby smoothing it and applying downwardly directed forces on the paper to maintain it in tension and securely in driving engagement with the driving pins 13a and 13b. The flexible fingers of the frictional tension-developing member 18 deflect on passing over the chart paper on the paper drive roll 13, thus providing a spring force which will always assure a uniform frictional engagement between the frictional tension-developing member 18 and the chart paper 11, thereby maintaining a constant and uniform tension on the chart paper 11. Another feature of the frictional tension-developing member 18 is that when the fingers deflect, a larger area of each finger as well as more than one finger may contact the chart paper 11. Thus, the life of the frictional tension-developing member is increased as well as the amount of frictional force. Further, as earlier mentioned, the spring action of the deflecting fingers eliminates the need for auxiliary springs or other pressure means common to many prior art devices for maintaining the proper friction between the frictional tension-developing members and the chart paper.

Since the principal requirement of the tension-developing members is the continuous and uniform downward pull on the chart paper 11, it will be seen from FIG. 3 that the elements may indeed be located behind the paper and may be associated with a tear-off strip 32 frequently provided on recording instruments. More particularly, instead of the gear drive shown in FIG. 1, there is provided in FIG. 3 a driving pulley 33 and a belt 34 threaded on a driven pulley 35. This driven pulley 35 is secured to a shaft 19a on which are mounted the frictional tension-developing members 17 and 18, only one of which, element 18, is shown. It is to be understood that more than two such elements may be utilized if desired. With the paper drive roll rotating in a counterclockwise direction, as indicated by the arrow, it will be seen that the tension-developing elements, including the element 18, are rotating in a counterclockwise direction with the flexable fingers thereof engaging chart paper 11, pressing it against and downwardly along the inner surface of the chart paper back-up member and tear-off strip 32. This back-up member and tear-off strip is supported by the frame and is relatively rigid. Thus, there are developed on the chart paper 11 tensional forces along its width which tend to pull it downwardly and away from the drive roll 13. At any time it may be desired to remove the paper which has received its markings from the marker or pin index assembly, one has only to lift the lower end of the chart paper to tear it along the sharp corner of the tear-off strip.

The degree and direction of inclination of the fingers of the frictional tension-developing member 18 are a matter of choice depending on the circumstances under which the recorder is to be operated. For example, where circumstances required a low frictional force and long life, the fingers would be inclined in a direction opposite to the direction of movement of the chart paper as shown in FIGS. 1 and 2. If a large amount of friction was desired, then the fingers could be inclined in the direction of movement of the chart paper as shown in FIG. 3. It is, of course, to be understood that the fingers need have no inclination in either direction, or in other words, be normal to the chart paper 11. Further, the amount of interference or deflection of the fingers on passing over the chart paper is a matter of choice. A greater amount of deflection of the fingers will result in a greater frictional force and vice versa.

The particular dimensions, durometer, direction and degree of inclination of the fingers, amount of deflection of the fingers, and relative peripheral speeds between the frictional tension-developing members and chart paper will, in a specific application, depend upon, among other things, the weight of the chart paper being used, the speed of the chart paper, the width of the chart paper and the diameter of the paper drive roll.

In a specific embodiment of the invention disclosed, the frictional tension-developing member was made of Buna N rubber of a durometer reading of 40–50 and had twenty-eight fingers ⅛" long and 3/16" wide. The fingers were deflected .030", sloped at a 30° angle in a direction opposite that of rotation and had a peripheral speed of 2.5 times that of the chart paper. The recorder operated very satisfactorily, maintaining the proper degree of tension on the chart paper for all chart paper speeds between ½" per hour and 4" per second.

Having now explained the principles of the invention as applied to selected embodiments, it is to be understood that further changes may be made within the scope and spirit of the appended claims.

What is claimed is:

1. In a recorder having a chart paper drive roll, chart paper disposed on a portion of said drive roll, means on said drive roll for engaging said chart paper and a device for maintaining said chart paper in tension, the improvement in said device for maintaining said chart paper in tension comprising:
    a plurality of tension-developing members disposed adjacent said paper drive roll and having a plurality of resilient and deformable fingers extending therefrom, a portion of which fingers interferingly engages said chart paper disposed on said chart paper roll, and
    means for positively moving said fingers in the normal direction of said chart paper movement at a rate greater than said chart paper whereby said resilient and deformable fingers will, due to said interfering engagement, exert and maintain themselves in pressure engagement with said chart paper while they frictionally engage and pass over said chart paper to maintain said chart paper in controlled tension.

2. The recorder of claim 1 wherein said plurality of members are rigidly supported a fixed distance from said paper drive roll.

3. The recorder of claim 1 wherein each of said plurality of members is circular in nature and said plurality of flexible and deformable fingers are disposed on the circumference thereof.

4. The recorder of claim 1 wherein said plurality of flexible and deformable fingers are inclined in a direction opposite that of said chart paper movement.

5. The recorder of claim 1 wherein said plurality of flexible and deformable fingers are inclined in the direction of said chart paper movement.

6. In a recorder having a chart paper drive roll, chart paper disposed on a portion of said drive roll, means on said drive roll for engaging said chart paper and a device for maintaining said chart paper in tension, the improvement in said device for maintaining said chart paper in tension comprising:
    a chart paper back-up member disposed in spaced relation from said drive roll and adjacent one side of the path of travel of said chart paper,
    a plurality of tension-developing members disposed on the opposite side of said path of travel of said chart paper and in opposing relation to said chart paper back-up member,
    said plurality of tension-developing members having a plurality of resilient and deformable fingers extending therefrom, a portion of which interferingly engages said chart paper pressing it against said chart paper back-up member, and
    means for positively moving said fingers in the normal direction of said chart paper movement at a rate greater than said chart paper whereby said resilient and deformable fingers will, due to said interfering engagement, exert and maintain themselves in pressure engagement with said chart paper while they frictionally engage and pass over said chart paper to maintain said chart paper in controlled tension.

7. The recorder of claim 6 wherein said plurality of members are rigidly supported a fixed distance from said back-up member.

8. The recorder of claim 6 wherein each of said plurality of members is circular in nature and said plurality of flexible and deformable fingers are disposed on the circumference thereof.

9. The recorder of claim 6 wherein said plurality of flexible and deformable fingers are inclined in a direction opposite that of said movement.

10. The recorder of claim 6 wherein said plurality of flexible and deformable fingers are inclined in the direction of said chart paper movement.

References Cited by the Examiner
UNITED STATES PATENTS

| | | | |
|---|---|---|---|
| 2,274,834 | 3/1942 | Ira | 226—195 X |
| 2,276,494 | 3/1942 | Kellogg | 226—187 |
| 2,446,400 | 8/1948 | Woolley | 346—136 X |
| 2,945,697 | 7/1960 | Meader | 346—136 X |

RICHARD B. WILKINSON, *Primary Examiner.*

LOUIS J. CAPOZI, *Examiner.*

J. W. HARTARY, *Assistant Examiner.*